United States Patent
Parameswaran et al.

(10) Patent No.: US 9,306,856 B2
(45) Date of Patent: Apr. 5, 2016

(54) OPTIMAL TREE ROOT SELECTION FOR TREES SPANNING MULTIPLE SITES

(71) Applicant: Cisco Technology, Inc., San Jose, CA (US)

(72) Inventors: Ramkumar Parameswaran, Cupertino, CA (US); Ayan Banerjee, Fremont, CA (US); Francois Edouard Tallet, Santa Clara, CA (US); Varun Chandulal Shah, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 246 days.

(21) Appl. No.: 13/842,195

(22) Filed: Mar. 15, 2013

(65) Prior Publication Data

US 2014/0269330 A1   Sep. 18, 2014

(51) Int. Cl.
*H04L 12/801* (2013.01)
*H04L 12/803* (2013.01)
*H04L 12/753* (2013.01)
*H04L 12/18* (2006.01)
*H04L 12/721* (2013.01)

(52) U.S. Cl.
CPC ............ *H04L 47/125* (2013.01); *H04L 12/185* (2013.01); *H04L 12/1886* (2013.01); *H04L 45/48* (2013.01); *H04L 45/123* (2013.01)

(58) Field of Classification Search
CPC ......... H04L 45/16; H04L 45/66; H04L 45/48; H04L 12/185
USPC .................. 370/238, 242, 248, 254, 256, 390
See application file for complete search history.

(56) References Cited

U.S. PATENT DOCUMENTS

| | | | |
|---|---|---|---|
| 2007/0127396 A1* | 6/2007 | Jain et al. ...................... | 370/254 |
| 2007/0133420 A1* | 6/2007 | Guven et al. .................. | 370/238 |
| 2009/0175274 A1* | 7/2009 | Aggarwal et al. ............. | 370/390 |
| 2010/0103846 A1* | 4/2010 | Chiabaut et al. .............. | 370/256 |
| 2011/0032936 A1* | 2/2011 | Ashwood-Smith et al. .. | 370/390 |
| 2012/0014261 A1* | 1/2012 | Salam et al. .................. | 370/242 |
| 2013/0114595 A1* | 5/2013 | Mack-Crane et al. ........ | 370/390 |
| 2014/0211797 A1* | 7/2014 | Luo et al. ...................... | 370/390 |

* cited by examiner

*Primary Examiner* — Andrew Chriss
*Assistant Examiner* — Peter Mak
(74) *Attorney, Agent, or Firm* — Patterson & Sheridan, LLP

(57) ABSTRACT

Embodiments provide a method, network device, and computer program product for optimizing traffic in a link-state network distributed across a plurality of sites. The method, network device, and computer program product include receiving a multi-destination message at a first node within the link-state network. Additionally, the method, network device, and computer program product include identifying a plurality of multi-destination trees within the network, each tree having a respective root node. The method, network device, and computer program product determine a plurality of cost values corresponding to each of the plurality of multi-destination trees, based on one or more links along a shortest path from the first node to the respective root node of each tree. Based on the determined cost values, the method, network device, and computer program product select one or more of the multi-destination trees and transmit the multi-destination message using the selected tree.

20 Claims, 8 Drawing Sheets

OPTIMAL TREE ROOT SELECTION FOR TREES SPANNING MULTIPLE SITES

TECHNICAL FIELD

Embodiments presented in this disclosure generally relate to switching network traffic, and more specifically, to techniques for optimizing multi-destination traffic across multiple sites using a plurality of multi-destination trees.

BACKGROUND

The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1.

Additionally, network traffic can generally be characterized based on its routing between a source and one or more destinations. For example, unicast traffic refers to network traffic that is routed from one source to one destination. As another example, traffic that is routed to two or more destinations is generally referred to as multi-destination traffic. Generally, multi-destination traffic includes broadcast traffic (i.e., traffic sent to all devices on a network) and multicast (i.e., traffic sent to multiple, selected addresses on a network), among other routing schemes.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
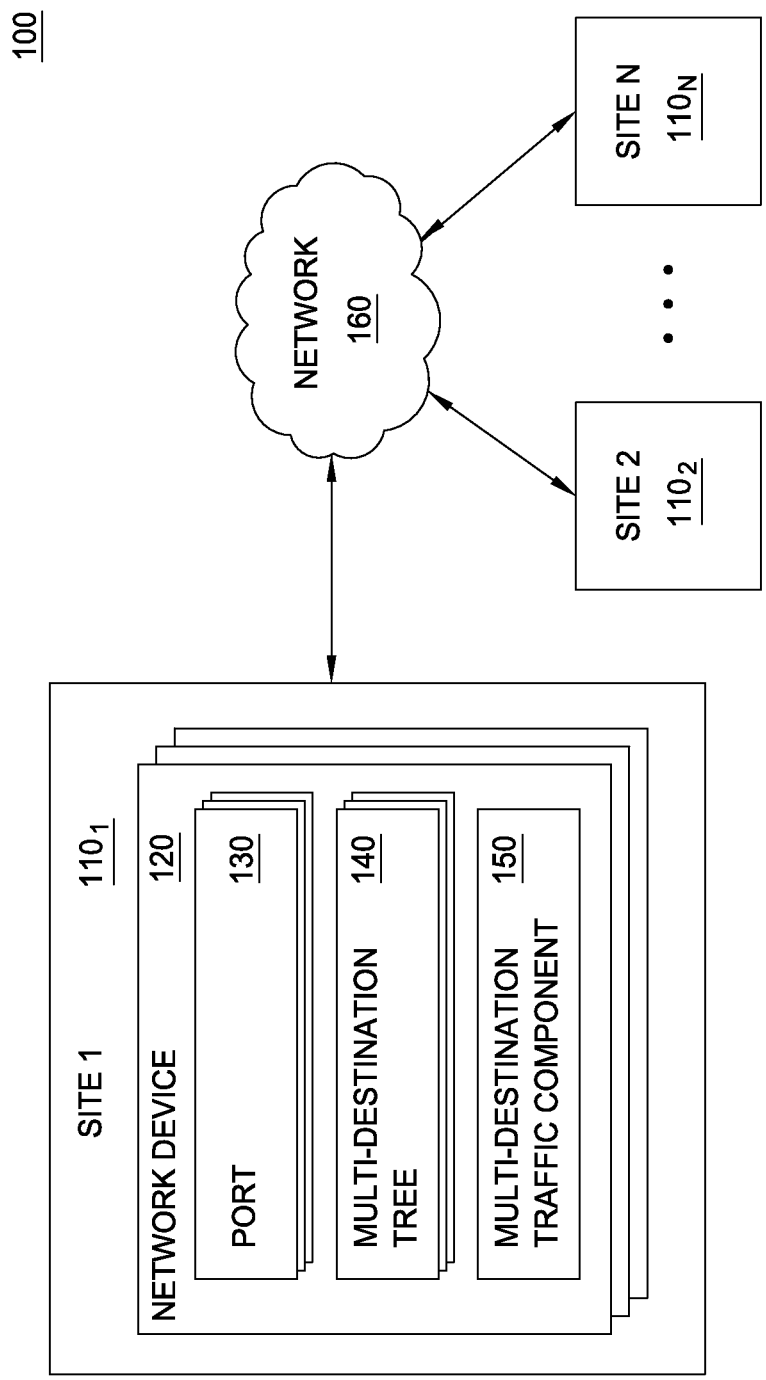
FIG. 1 illustrates a network spanning multiple sites, according to one embodiment described herein.

Embodiments provide a method, network device, and computer program product for optimizing traffic in a link-state network distributed across a plurality of sites. The method, network device, and computer program product include receiving a multi-destination message at a first node within the link-state network. Additionally, the method, network device, and computer program product include identifying a plurality of multi-destination trees within the network, each tree having a respective root node. The method, network device, and computer program product determine a plurality of cost values corresponding to each of the plurality of multi-destination trees, based on one or more links along a shortest path from the first node to the respective root node of each tree. Based on the determined cost values, the method, network device, and computer program product select one or more of the multi-destination trees and transmit the multi-destination message using the selected tree.

EXAMPLE EMBODIMENTS

Generally speaking, multi-destination traffic can be transmitted in a variety of different network types, e.g., a bridged network. A bridged network is generally comprised of two or more networks (or network segments) that are joined to create an aggregate network. While there are many advantages to bridged networks, bridged networks can introduce many challenges as well. For instance, bridge loops can occur within a bridged network. Bridge loops permit the unchecked rebroadcasting of multicast or broadcast messages until the network is saturated with copies of the original message, and can occur when multiple layer 2 paths exist between two network devices or two connected ports of a single network device.

Transparent Interconnection of Lots of Links (TRILL) is a standard that uses Layer 3 routing techniques to create a large cloud of links that appear to neighboring IP nodes to be a single IP subnet. Additionally, TRILL supports Layer 2 features such as Virtual Local-Area Networks (VLANs), optional auto-configuration, and multicast/broadcast with no additional protocol. In a TRILL network, a multi-destination tree can be used to prevent bridge loops from occurring. For instance, such a multi-destination tree could be rooted at a single network device within the network and could specify paths along which all data plane traffic flows. Generally, the multi-destination tree may be used by logically disabling all links that are not part of the tree, resulting in only one active path between any two network nodes. TRILL also permits redundant links to exist in a network, providing backup paths automatically if an active path fails. Such a multi-destination tree may be capable of routing unicast and/or multi-destination traffic as well. Other link-state network protocols include Cisco's® FabricPath Technology and Spanning Tree Protocol.

In a bridged network made up of multiple networks at different physical sites, a multi-destination tree could include one or more links that connect to network devices located at different sites (e.g., different data centers). As these network devices in the bridged network may be separated by a substantial distance one another, the links between the network devices may be quite expensive (e.g., in terms of monetary cost, latency, etc.). That is, the interconnection of network devices is accomplished through wide-area network (WAN)

links, which are relatively expensive and slow, instead of through the relatively inexpensive and fast local-area network (LAN) links.

Generally, a multi-destination tree works to disable certain links within the network in order to ensure that only one forwarding path between two network devices in the tree is active at any given time. However, these logically disabled paths may result in the selection of less-than-optimal path for transmitting data. For example, although a direct link may exist between two particular network devices, the direct link may be logically disabled when a particular multi-destination tree is selected. As such, traffic between the two particular network devices may flow across a different, less efficient path.

In some networks, traffic may be load balanced between multiple multi-destination trees, in order to produce a more even distribution of workload across the links in the network. For instance, when multi-destination traffic is received by a network device, the traffic could be hashed onto one of the plurality of multi-destination trees that are supported by the network. However, such load balancing may not account for locations of specific network elements within the various tree structures, and thus traffic may be routed using a less efficient tree, even though a more efficient tree may be are available.

As such, embodiments generally provide techniques for optimizing traffic in a link-state network. Embodiments may receive, at a first node within the link-state network, a multi-destination message to be transmitted to a plurality of destination nodes. Examples of such a multi-destination message include, without limitation, a broadcast message and a multicast message. Additionally, embodiments identify a plurality of multi-destination trees within the link-state network, where each of the plurality of multi-destination trees has a respective root node.

Embodiments may also determine link cost values for each link on each multi-destination tree being considered to route the traffic, in order to optimize the routing of multi-destination traffic. Such link cost values may be based on, for example, the cost of transmission bandwidth, the geographic distance between network devices, the cost (or additional bandwidth required) of securing the data through encryption or other means, the availability of redundant paths within the network, the measure of latency, or other factors, combinations of factors, or weighted combinations of factors. Embodiments may then determine a cost from the first node to the root node of each multi-destination tree being considered. For instance, embodiments could determine a cost value corresponding to each multi-destination tree being considered, based on the determined link cost values for each of the multi-destination trees. For instance, embodiments could calculate the sum of the individual link values in a particular multi-destination tree to determine the cost value for the particular multi-destination tree. For example, the tree with the least amount of cost could be selected for transmitting the message. As another example, the cost value could be calculated using mathematical or logical operations performed on individual link cost values or combinations of link cost values. For instance, the cost value for a tree could equal an average link cost value. As yet another example, the cost value for a particular tree could equal the number of links within the tree having a link cost value greater than a specified maximum.

Embodiments could then select one of the multi-destination trees to use in transmitting the multi-destination message, based on the cost values calculated for each of the multi-destination trees. In one embodiment, a tree could be selected by applying a load-balancing function to two or more of the trees having the lowest cost values. Advantageously, by selecting a tree based on the determined cost values, embodiments may increase the probability of selecting an optimal tree that is more efficient for use in transmitting the multi-destination message. After selecting a multi-destination tree based on cost values, embodiments may transmit the multi-destination message using the selected tree. In a particular embodiment, a plurality of multi-destination trees may be determined, where the root nodes of the multi-destination trees are distributed equally across the multiple sites of a bridged network. Advantageously, an equal distribution of root nodes may ensure a lower cost of transmitting data within a particular multi-destination tree in the network, and may also enhance the redundancy of networks whose devices are located at multiple sites.

An example configuration for a link-state network spanning multiple sites is shown in FIG. 1, which illustrates a network 100 containing one or more network devices 120 located at each site $110_{1-n}$, according to one embodiment described herein. Each network device 120 comprises one or more communication ports 130, enabling communications between network devices 120 using inter- or intra-site links. Examples of network devices 120 may include both physical network devices and virtual network devices that are hosted on one or more physical network devices. Each network site may also include other intermediary network devices that forward data plane traffic to other devices. These intermediary network devices may (or may not) be configured with a respective multi-destination traffic component 150. Similarly, the network 160 represents one or more intermediary network devices that forward data plane traffic from one end device to another. For purposes of this example, assume that the network 160 is a WAN (e.g., the Internet), whereas connections between network devices 120 within a site 110 are LAN links. In addition to forwarding data plane traffic, the network 160 may forward management plane or control plane traffic between the network device 120 at Site 1 $110_1$ and additional network devices 120 located at Site 1 $110_1$ or at other sites $110_{2-n}$.

Additionally, each network device 120 includes a plurality of multi-destination trees 140 supported by the network 100. Generally, each of the multi-destination trees 140 has a respective root node and contains information about the physical links between devices within the particular network 100. For instance, a multi-destination tree could contain information about the physical links that should remain enabled when the multi-destination tree is used, and any physical connections not included in a multi-destination tree could be logically disabled by one or more network devices 120, in accordance with, e.g., TRILL or FabricPath protocol requirements.

As shown, each network device 120 also includes a multi-destination traffic component 150. The multi-destination traffic component 150 is generally configured to select an optimal multi-destination tree from a plurality of multi-destination trees, based on cost values associated with the plurality of multi-destination trees, and to transmit multi-destination message data using the selected tree. More specifically, upon receiving a multi-destination message at a particular network device 120, the corresponding multi-destination traffic component 150 could identify the plurality of multi-destination trees 140 within the network 100. The multi-destination traffic component 150 could then determine cost values for each tree 140 by determining the shortest path from the particular network device 120 to the respective root node of each tree 140, and could then calculate the sum of the link cost values of the one or more links of each tree along the respective shortest path. The multi-destination traffic component 150 could then select one of the trees 140 based on the determined cost values. The multi-destination traffic component 150 could then transmit the multi-destination message according to the logical structure of selected tree 140.

Figure 2:
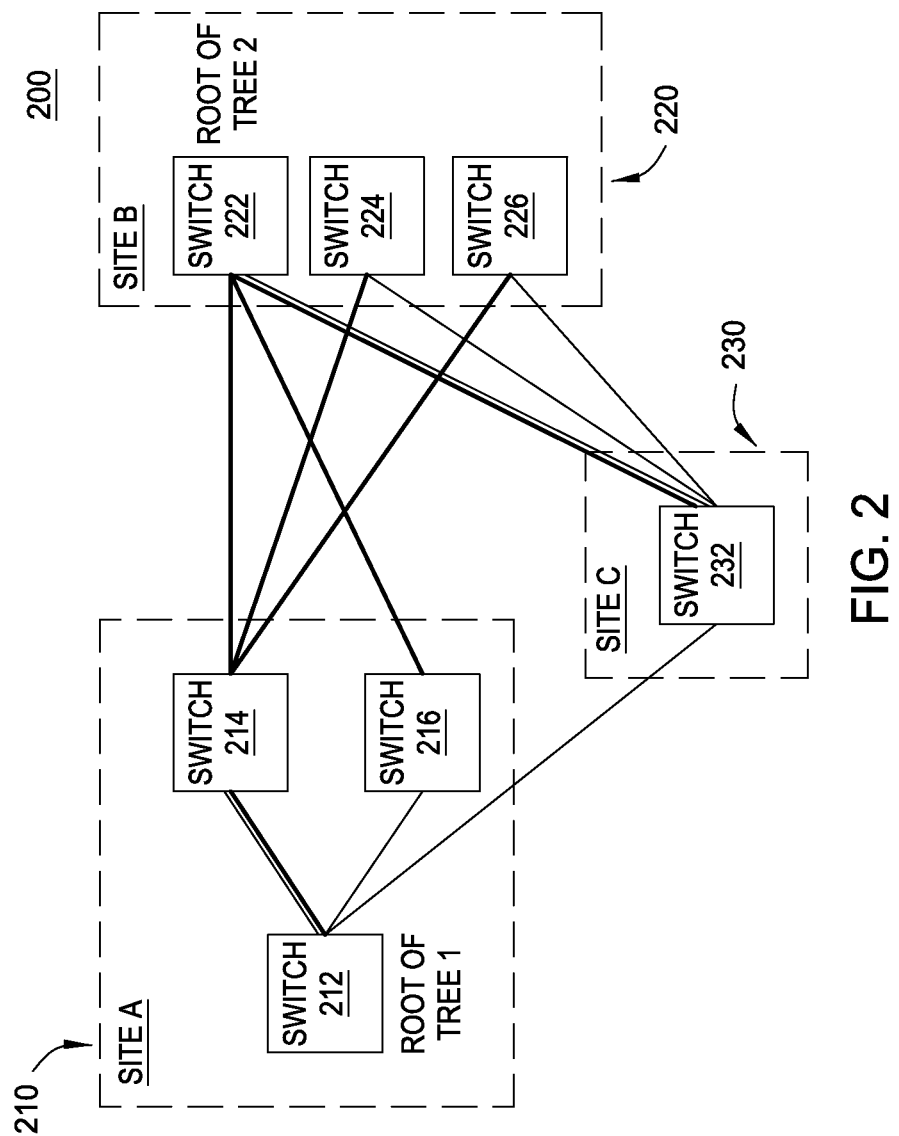
FIG. 2 illustrates a link-state network, according to one embodiment described herein.

An example of such an embodiment will now be discussed with respect to FIGS. 2 and 3A-B. FIG. 2 illustrates a link-state network, according to one embodiment described herein. As shown, the network 200 is comprised of Site A 210, Site B 220, and Site C 230, as well as two multi-destination trees. Each site has one or more network devices 120 located therein: switches 212, 214, and 216 at Site A 210; switches 222, 224, and 226 at Site B 220; and switch 232 at Site C 230. The physical connections existing between switches and their respective sites are depicted by thin and thick lines. Here, Tree 1 is rooted at switch 212 and is depicted by thin lines, and Tree 2 is rooted at switch 222 and is depicted by thick lines.

As discussed above, the multi-destination traffic component 150 is generally configured to select one of a plurality of multi-destination trees in a particular network, e.g., for use in transmitting a particular message. Generally speaking, which of the plurality of trees is selected by the multi-destination traffic component 150 may depend on the network device at which the multi-destination message is received. For example, the multi-destination traffic component 150 could select a first one of the multi-destination trees for a first multi-destination message received at a first network device, and could select a second, different one of the multi-destination trees for a second multi-destination message received at the second network device. That is, as the multi-destination traffic component 150 is configured to select the most efficient multi-destination tree for use in transmitting a given message, which of the plurality of multi-destination trees is the most efficient may vary across the different network devices within the network 200.

Figure 3A:
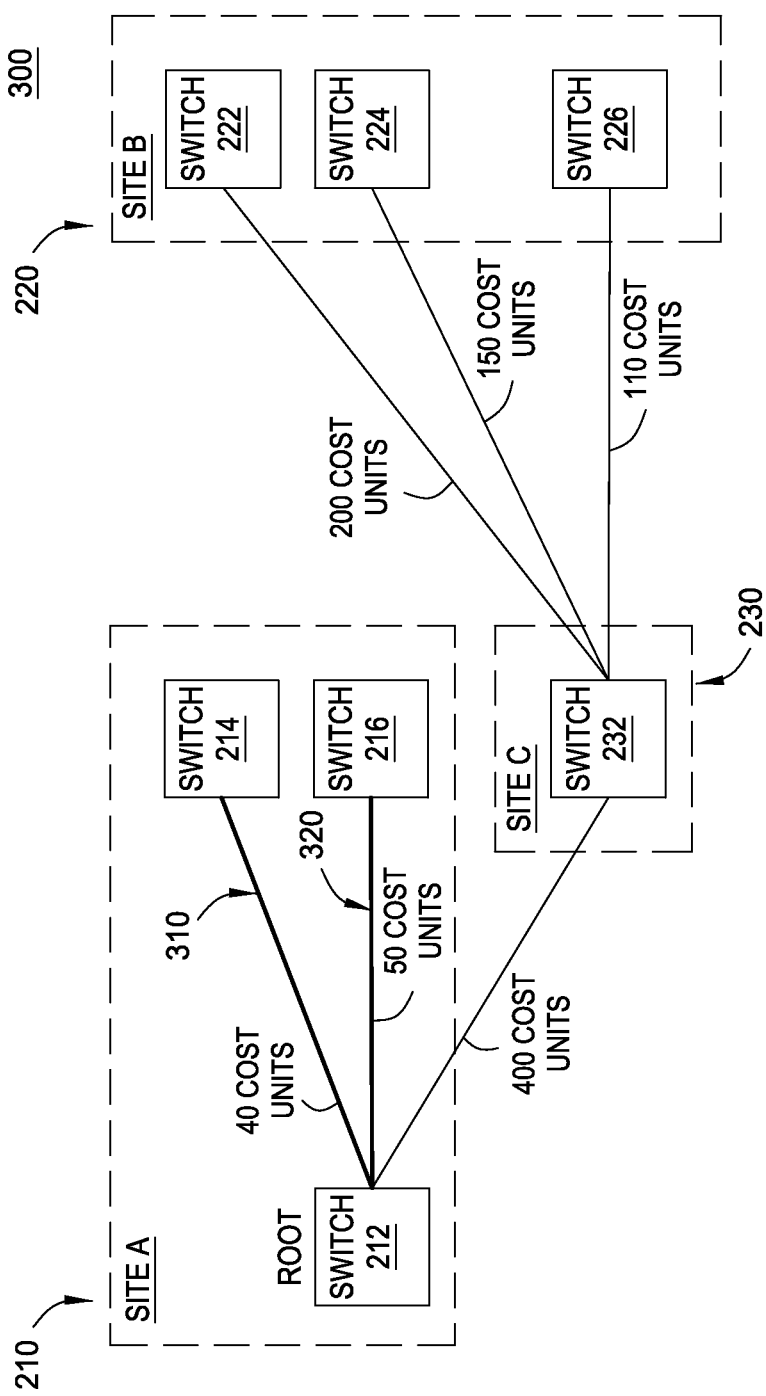
FIGS. 3A and 3B illustrate a link-state network transmitting multi-destination traffic, according to one embodiment described herein.

To demonstrate, FIG. 3A illustrates a link-state network transmitting multi-destination traffic, according to one embodiment described herein. The network 300 depicts the same switches displayed in network 200 (as depicted in FIG. 2), but displays only those physical connections between switches that remain logically enabled within Tree 1. In other words, the physical connections that are not included in Tree 1 have been logically disabled (e.g., according to the TRILL or FabricPath protocols), and thus are not depicted in FIG. 3A. For purposes of this example, link cost values have been assigned by the multi-destination traffic component 150 to each link within the tree, and are described in quantities of cost units. As described above, a unit of cost may be based on (without limitation) a monetary cost, a latency cost, a bandwidth cost, and other factors and combinations of factors as well.

As an example, a multi-destination message could be received at switch 214 that specifies a destination of switch 216. If the message is routed using Tree 1, switch 214 may transmit the message along link 310 to the root node of Tree 1 at switch 212, which may then transmit the message via link 320 to its destination, switch 216. To determine the cost of using this routing path, the multi-destination traffic component 150 could determine a cost value based on the sum of the individual link costs. In this example, the multi-destination traffic component 150 could add the respective link cost values of link 310 and link 320, which results in a sum of 90 cost units. As such, transmission of the message using Tree 1 results in transmitting the message locally within Site A 210, and thus the message is transmitted relatively efficiently and at a relatively low cost.

Figure 3B:
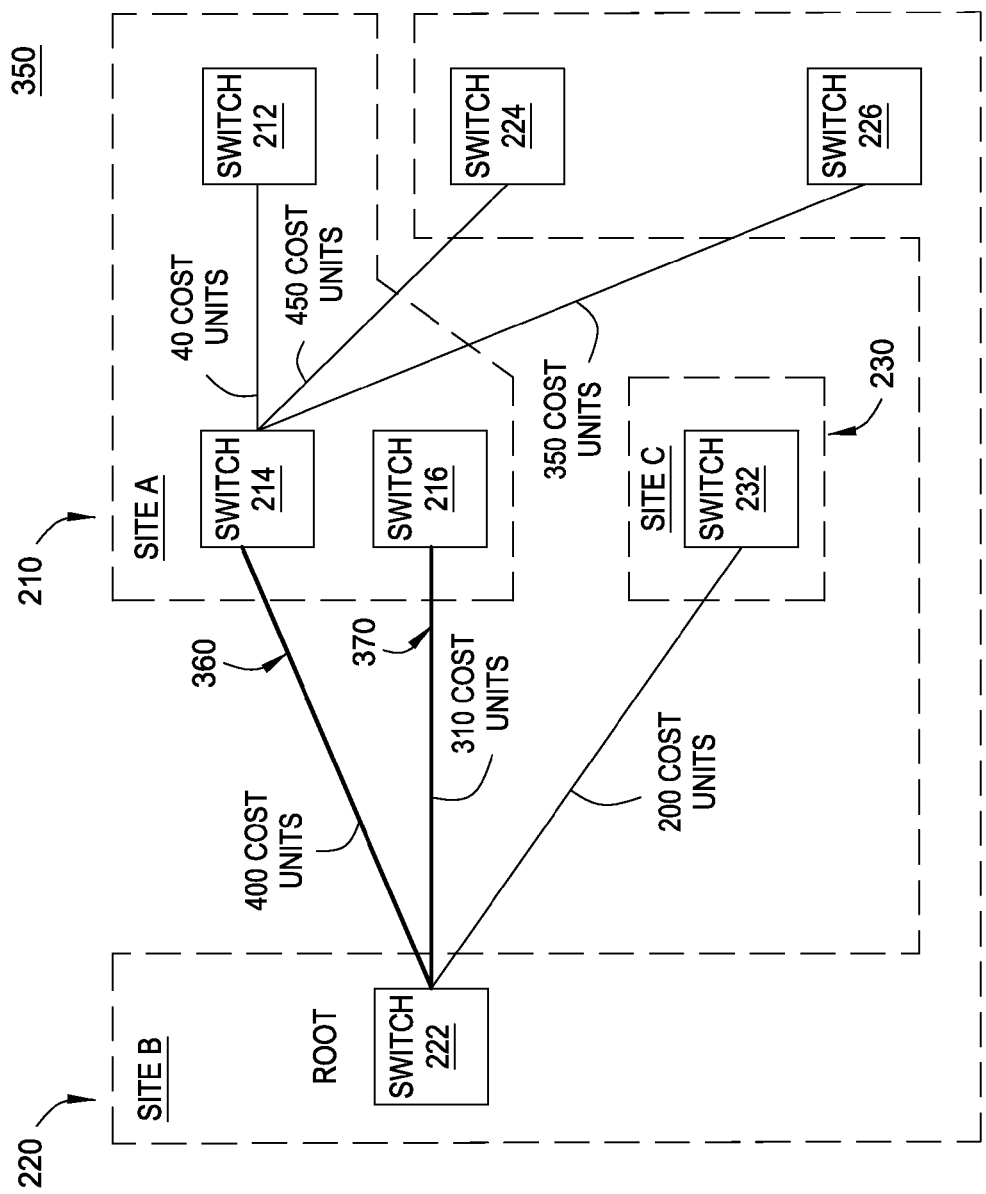

On the other hand, FIG. 3B illustrates in network 350 the same switches displayed in network 200 (as depicted in FIGS. 2 and 3A), but displays only those physical connections between switches that remain logically enabled within Tree 2. That is, the physical connections that are not included in Tree 2 could have been logically disabled according to the TRILL protocol (or, for instance, the FabricPath protocol), and are not depicted. Additionally, link cost values (expressed in units of cost) have been assigned by the multi-destination traffic component 150 to each link within the tree.

Here, if the message is transmitted using the depicted Tree 2, the switch 214 may transmit the message along link 360 to the root node of Tree 2 at switch 222, which may then transmit the message via link 370 to its destination, switch 216. While the message traverses the same number of links on either tree (i.e., two), the message transmitted on Tree 2 travels from Site A 210 to Site B 220 and returns to Site A 210. As a result, the combination of the respective link cost values of links 360 and 370 results in a sum of 710 cost units. Thus, transmitting the message on Tree 2 results in a significantly greater cost (and possibly a slower transmission) relative to transmitting the message using Tree 1.

Figure 4:
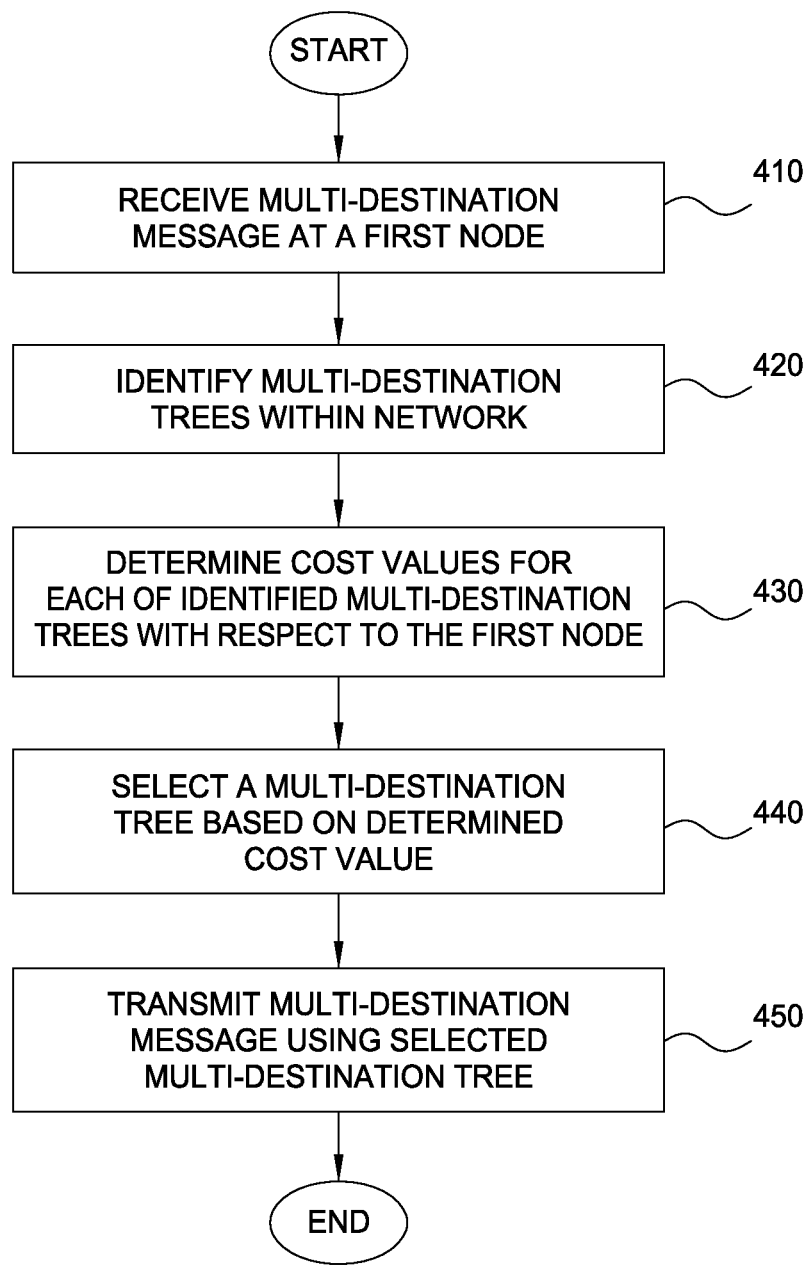
FIG. 4 illustrates a method for transmitting multi-destination traffic within a link-state network, according to one embodiment described herein.

As discussed above, embodiments described herein provide techniques for intelligently route multi-destination traffic by selecting an optimal multi-destination tree for routing a particular message. An example of such a technique is shown in FIG. 4, which illustrates a method for transmitting multi-destination traffic within a link-state network, according to one embodiment described herein. As shown, the method 400 begins at block 410, where a multi-destination message is received at a first node configured with a multi-destination traffic component 150 (i.e., a network device 120). Additionally, the multi-destination traffic component 150 identifies a plurality of multi-destination trees 140 within the network (block 420).

For each of the multi-destination trees 140 identified by the multi-destination traffic component 150, the multi-destination traffic component 150 determines a cost value for the tree 140 with respect to the first node (block 430). For instance, the multi-destination traffic component 150 could determine the cost value for a particular tree by determining a link cost value for each link along the shortest path between the root node of the tree and the first node at which the multi-destination message was received. Such link cost values may be determined, for example, based on the cost of transmission bandwidth, the geographic distance, the cost (or additional bandwidth required) of securing the data through encryption or other means, the availability of redundant paths within the network, the measure of latency, or other factors, combinations of factors, or weighted combinations of factors. More generally, it is broadly contemplated that any technique(s) for calculating a cost value associated with a network link may be used, consistent with the functionality described herein.

Returning to the present example, the multi-destination traffic component 150 may determine cost values for each tree based on the link cost values previously determined for each tree. As described above, the cost value may be a sum of the individual link cost values. In one embodiment, the multi-destination traffic component 150 is configured to calculate the cost value for a particular tree using other mathematical and/or logical operations performed on the link cost values (or combinations of the link cost values). As an example, the multi-destination traffic component 150 could calculate the cost value for a tree by computing an average link cost value for the links along the shortest path between the root node of the tree and the first node at which the multi-destination message is received. In another example, the multi-destination traffic component 150 could calculate the cost value for a particular tree by computing the number of links within the tree having a link cost value greater than a specified maximum cost value.

Once the cost values for each of the multi-destination trees are calculated, the multi-destination traffic component 150 selects one of the multi-destination trees 140 for use in transmitting the multi-destination message, based on the determined cost values (block 440). At block 450, the multi-destination traffic component 150 transmits the multi-destination message using the selected tree, and the method 400 ends. Of note, the multi-destination traffic component 150 may be configured to selectively select optimal multi-destination trees for use in forwarding ingress multi-destination traffic into a TRILL (or FabricPath) network, but transit traffic received may still be forwarded using its assigned tree, even if such an assigned tree is a non-optimal tree. Thus, the multi-destination traffic component 150 could be configured to only select optimal multi-destination trees for routing traffic that is coming from outside of the network and heading into the network onward towards its final destination. However, the multi-destination traffic component 150 could simply forward transit packets received on any node inside the network (e.g., a TRILL network or a FabricPath network), using the multi-destination tree on which the transit packets arrived.

According to one embodiment, the multi-destination traffic component 150 may select a multi-destination tree based on load balancing considerations, in order to improve network throughput and/or better utilize available network resources. For instance, the multi-destination traffic component 150 could first select a predetermined number of optimal trees, and could apply a load-balancing function in order to select one of the predetermined number of optimal trees for use in transmitting the message. Such an embodiment is described in further detail below, in the discussion relating to FIG. 6.

Figure 5:
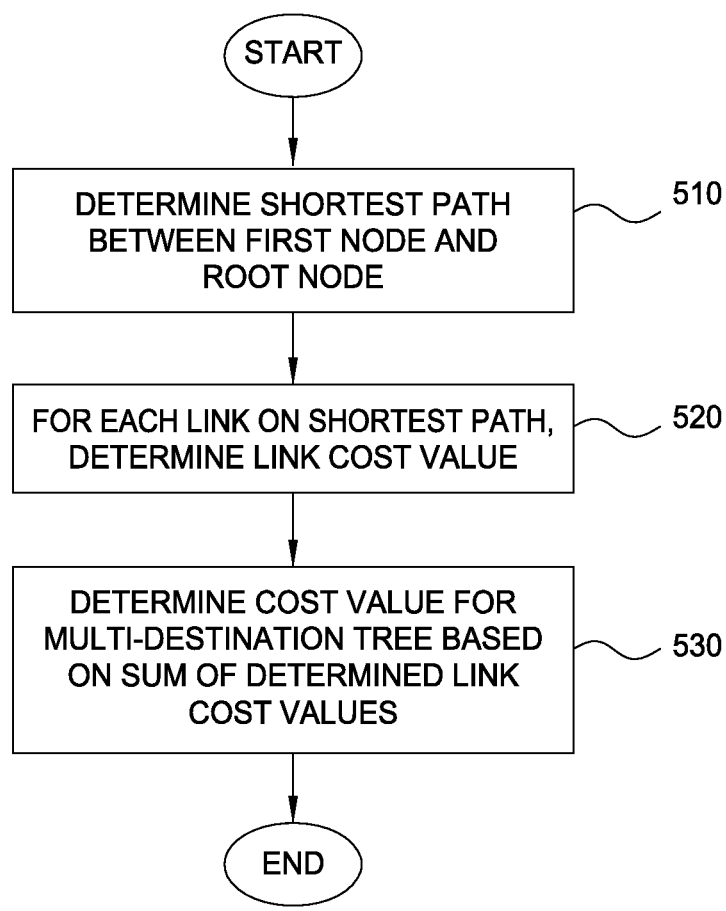
FIG. 5 illustrates a method for determining cost values for a multi-destination tree within a link-state network, according to one embodiment described herein.

As described above, selecting a tree based on cost values (or the combination of cost values and a load-balancing function) increases the probability of selecting an optimal tree, whether the selected tree has fewer WAN links or is otherwise preferable according to the factors for determining link cost values, and the multi-destination traffic component 150 may use various methods for calculating the cost value with respect to a particular tree. FIG. 5 illustrates one such method for determining cost values for a multi-destination tree within a link-state network, according to one embodiment described herein. As shown, the method 500 begins at 510, where the multi-destination traffic component 150 determines a shortest path between the first node and the root node of the particular multi-destination tree. For each link along the shortest path determined at block 510, the multi-destination traffic component 150 determines a link cost value (block 520). Such a link cost value may be in units of, without limitation, monetary cost, latency, bandwidth, and so on.

The multi-destination traffic component 150 then determines a cost value for the multi-destination tree, based upon the sum of the link cost values determined at block 520 (block 530), and the method 500 ends. As discussed above, the multi-destination traffic component 150 could use the calculated cost values for each of the multi-destination trees to select one of the multi-destination trees to use in transmitting a particular network message. For instance, the multi-destination traffic component 150 could compare the determined cost values for each the trees the cost values for the other trees, and could select the multi-destination tree(s) having the lowest cost values, for use in transmitting the multi-destination message. Advantageously, doing so enables the multi-destination traffic component 150 to select an optimal multi-destination tree for transmitting the multi-destination message.

Figure 6:
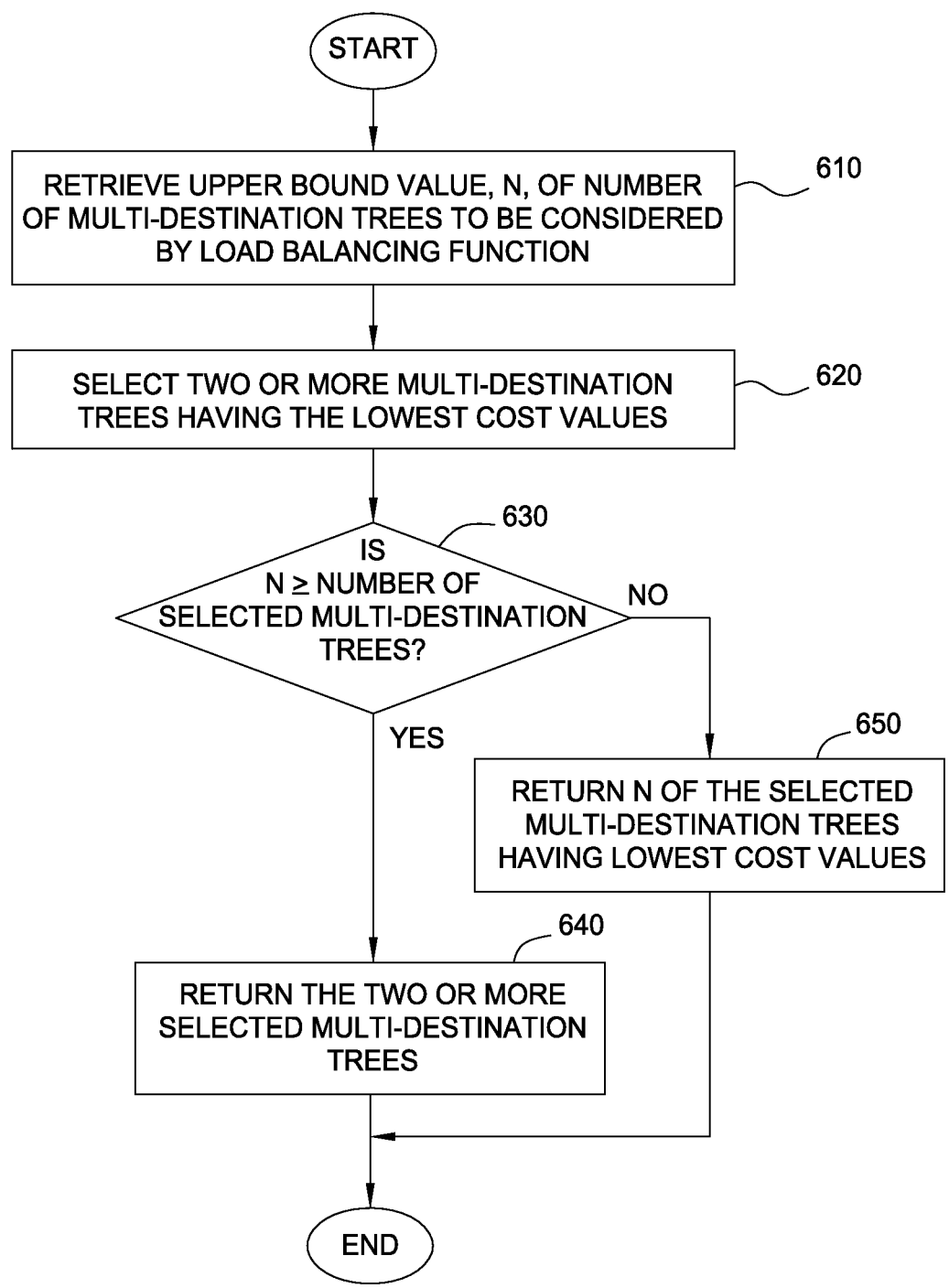
FIG. 6 illustrates a method for selecting multi-destination trees to be considered by a load-balancing function, according to one embodiment described herein.

Additionally, the multi-destination traffic component 150 may be configured to make more efficient use of network resources by including load balancing considerations within the cost value-based traffic routing. To that end, FIG. 6 illustrates a method for selecting multi-destination trees to be considered for further selection by a load-balancing function, according to one embodiment described herein. Method 600 may be incorporated as an element within block 440 of method 400. Method 600 begins at block 610, where the multi-destination traffic component 150 retrieves an upper bound value, n, on the number of multi-destination trees to be considered by the load-balancing function. This upper bound value may be provided by a user via a command line interface or other means, or may be determined by network devices based on network throughput, availability of network resources, or other factors.

The multi-destination traffic component 150 then selects from the set of identified multi-destination trees (e.g., as identified in block 420) two or more multi-destination trees having the lowest cost values (e.g., as determined in block 430) (block 620). For instance, the lowest cost values may be a single lowest cost value, one or more lowest cost values based on a specified range of cost values, or one or more lowest cost values based on a specified number of trees to select. The specified range of cost values and the specified number of trees to select may be provided by a user via a command line interface or other means, or may be determined by the multi-destination traffic component 150 based on network throughput, availability of network resources, or other factors.

For example, the multi-destination traffic component 150 could identify eight trees, having respective cost values of 10, 10, 10, 10, 15, 20, 30, and 100. In one embodiment, the multi-destination traffic component 150 is configured to select all of the trees having the single lowest cost value. Thus, in the present example, the multi-destination traffic component 150 could select the four trees having cost values of 10. In another embodiment, the multi-destination traffic component 150 is configured to select trees based on a range of lowest cost values. For instance, the multi-destination traffic component 150 could be configured to select trees having cost values within a set range of the lowest cost value (e.g., within 150% of the lowest cost value). Thus, in the present example, the multi-destination traffic component 150 could select the trees corresponding to the cost values 10, 10, 10, 10, and 15. As another example, the multi-destination traffic component 150 could be configured to select one or more multi-destination trees having cost values that are less than a predetermined threshold value. For instance, in the present example, assuming a threshold value of 30, the multi-destination traffic component 150 could select the trees corresponding to the cost values 10, 10, 10, 10, 15, and 20.

In one embodiment, an upper bound value on the number of trees (irrespective of any individual tree cost value) may be specified to further limit the number of lowest cost value multi-destination trees 140 that will be considered by the load-balancing function. The upper bound value may be provided by a user via a command line interface or other means, or may be determined by the multi-destination traffic component 150 based on network throughput, availability of network resources, or other factors. For example, assuming an upper bound value of "4", the multi-destination traffic component 150 could select only four of the multi-destination trees for load balancing purposes, even if there are five multi-destination trees sharing the lowest cost value.

At block 630, the multi-destination traffic component 150 compares the upper bound value, n, to the number of trees selected for consideration in block 630. If the upper bound value is equal or greater than the number of selected trees, the multi-destination traffic component 150 may provide all of the selected trees to the load-balancing function (block 640). Conversely, if the number of selected trees is greater than the upper bound value, the multi-destination traffic component 150 selects n trees for use with the load-balancing function (block 650).

For example, assume as in the earlier example that the multi-destination traffic component identifies eight trees having the cost values of 10, 10, 10, 10, 15, 20, 30, and 100. The multi-destination traffic component 150 may select a subset of the trees having a single lowest cost value. Thus, in this example, the multi-destination traffic component 150 could select the four trees having cost values of 10. Additionally, assume that the multi-destination traffic component 150 is configured to select a maximum of five multi-destination trees for load balancing purposes. As such, the multi-destination traffic component 150 could retrieve that upper bound value n=5. Because (in this example) n is greater than the number of trees previously selected for consideration (i.e., four), the multi-destination traffic component 150 may select all four trees having the lowest cost value for use by the load-balancing function. As another example, if the multi-destination traffic component 150 retrieves an upper bound value n=3, the multi-destination traffic component 150 could only three of the four trees having the lowest cost value for load balancing purposes.

Figure 7:
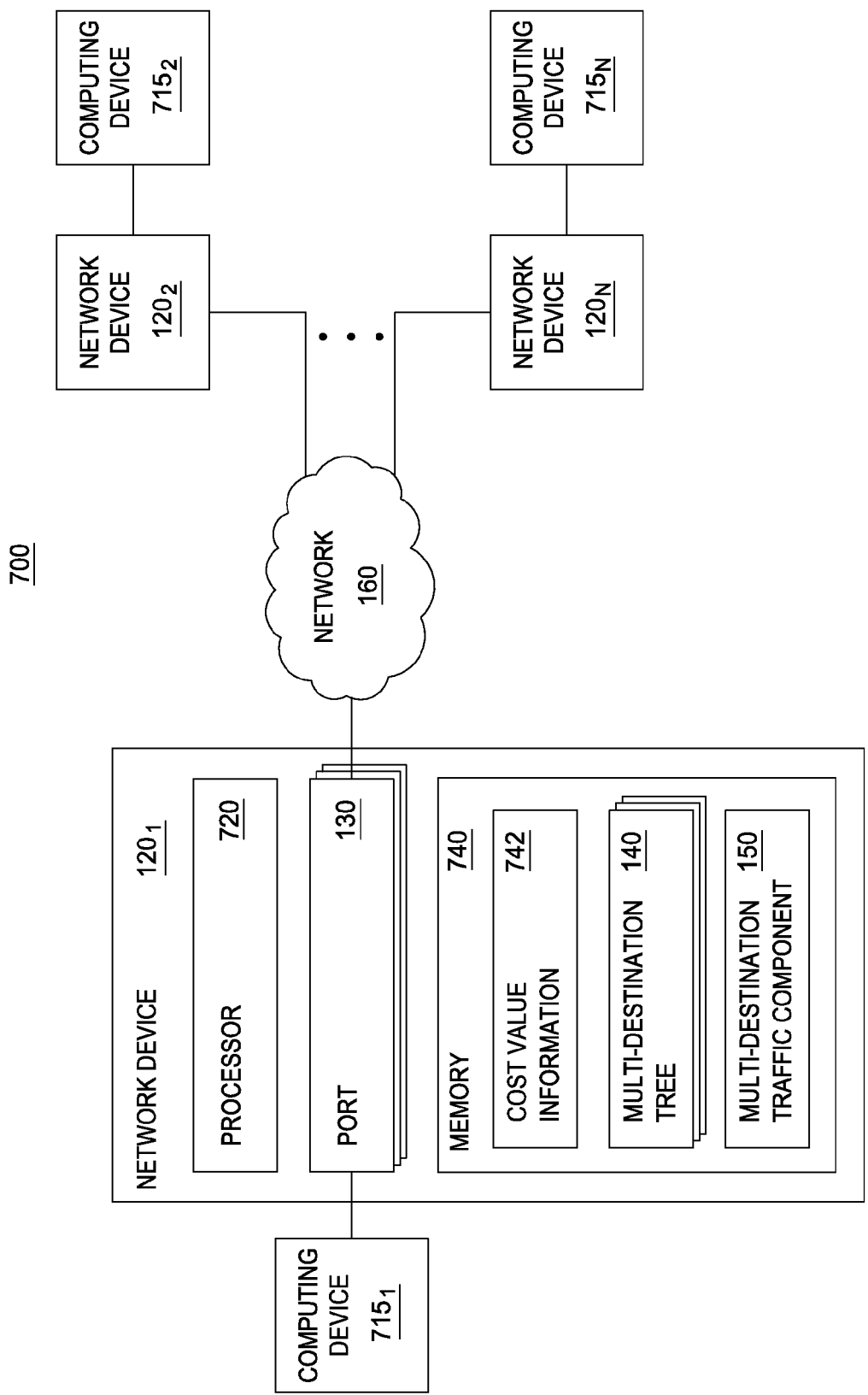
FIG. 7 illustrates a network containing devices configured to optimize multi-destination traffic, according to one embodiment described herein.

FIG. 7 illustrates a network containing devices configured to optimize multi-destination traffic, according to one embodiment described herein. As shown, the communication network 700 includes computing devices $715_1$-n, coupled respectively to network devices $120_1$-n. The network devices $120_1$, include a processor 720, communication ports 130, and memory 740. The processor 720 may be any processing element capable of performing the functions described herein. The processor 720 represents a single processor, multiple processors, a processor with multiple cores, and combinations thereof. The memory 740 may be either volatile or non-volatile memory and include RAM, flash, cache, disk drives and the like. Although shown as a single entity, the memory 740 may be divided into different memory storage element such as RAM and one or more hard disk drives. As shown, the memory 740 includes cost value information 742, a plurality of multi-destination trees 140, and a multi-destination traffic component 150. The ports 130 facilitate communication between the network device $120_1$, a coupled computing device $715_1$, and other coupled network devices $120_{2\text{-}n}$ and computing devices $715_2$—n. The network 160 represents one or more intermediary network devices that forward data plane traffic from one end device to another. The network may be a WAN (e.g., the Internet) or a LAN. In addition to forwarding data plane traffic, the network 160 may forward management plane or control plane traffic between the network device $120_1$ and the network devices $120_2$-n or between the network device $120_1$ and the computing devices $715_{1\text{-}n}$.

The multi-destination traffic component 150 is configured substantially as described above. The multi-destination traffic component 150 may select a multi-destination tree from a plurality of multi-destination trees 140 based on cost information 742. The multi-destination traffic component 150 may then transmit a multi-destination message to the next network device 120 in the selected multi-destination tree 140 using communication ports 130.

The memory 740 of network device $120_1$ further comprises cost value information 742. The cost value information 742 comprises one or more link cost values corresponding to a respective link existing between any two network devices 120. Such link cost values represent the cost of transmitting a message using a particular link, and may be based on one or more of the factors, combinations of factors, or weighted combinations of factors described above. To determine a cost value for a particular multi-destination tree 140, the multi-destination traffic component 150 may then sum the link cost values on the multi-destination tree 140 or perform other mathematical or logical operations on the link cost values, or on combinations of the link cost values, as described above.

As an example, assume that network device $120_2$ receives a multi-destination message to transmit to network device $120_4$ (not depicted). Assume further that network device may transmit the message on one of two trees; the first tree has links connecting network devices $120_2$ and $120_1$ and network devices $120_1$ and $120_4$. The second tree has links connecting network devices $120_2$ and $120_3$ (not depicted) and network devices $120_3$ and $120_4$. The cost value information 742 stored in network device $120_2$ contains the individual link costs within each tree; assume that the link costs of the first tree are 50 units each, while the link costs of the second tree are only 10 units each. The multi-destination traffic component 150 of network device $120_2$ determines a cost value associated with each tree. Assume that the multi-destination traffic component calculates cost values for a tree as the sum of the individual link costs; the calculated cost value to transmit using the first tree is thus (2 links×50=) 100 units; the cost value to transmit using the second tree is (2 links×10=) 20 units. The multi-destination traffic component 150 selects the tree having lower cost (i.e., the second tree) and transmits the multi-destination message to the next device on the selected tree using port 130 of network device $120_2$.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a multi-destination traffic component 150 could execute on a physical network device 120 hosting multiple virtual network devices in a data center for the cloud, with the virtual network devices being included in one or more multi-destination trees 140. Upon receiving a multi-destination message, the multi-destination traffic component 150 could intelligently select one of a plurality of multi-destination trees having in the tree structure links to one or more virtual network devices. The virtual network devices may thus be used by the multi-destination traffic component 150 in transmitting the multi-destination message. Advantageously, doing so helps to ensure efficient utilization of network resources in the data centers for the cloud.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for optimizing traffic in a link-state network, the method comprising:
    receiving, at a first node within the link-state network, a multi-destination message to be transmitted to a plurality of destination nodes;
    identifying a plurality of multi-destination trees within the link-state network that include the first node, each of the plurality of multi-destination trees having a respective root node;
    determining a plurality of cost values, wherein each of the plurality of cost values corresponds to a respective one of the identified plurality of multi-destination trees, and is based on one or more links along a shortest path from the first node to the root node of the respective multi-destination tree;
    applying a load-balancing function to a predetermined number of the identified plurality of multi-destination trees corresponding to the smallest values of the determined plurality of cost values, wherein the predetermined number does not exceed a predetermined upper bound value; and
    transmitting the multi-destination message from the first node using a multi-destination tree selected by the load-balancing function.

2. The method of claim 1, wherein the link-state network is distributed across a plurality of sites.

3. The method of claim 2, wherein the plurality of multi-destination trees includes, for each of the plurality of sites, at least one multi-destination tree having a root node located at the site.

4. The method of claim 1, wherein determining the plurality of cost values further comprises, for each of the plurality of multi-destination trees:
    determining the shortest path having fewest links between the first node and the root node of the multi-destination tree;
    determining a respective link cost value for each link along the shortest path; and
    determining the cost value for the multi-destination tree based on the sum of the link cost values for each link along the shortest path.

5. The method of claim 4, wherein the link cost value for each link is determined based on at least one of monetary cost, geographic distance, cost of security, availability of redundancy within the link-state network, and a measure of latency.

6. The method of claim 1, wherein the upper bound value is provided via user input.

7. The method of claim 1, further comprising:
    determining, from the identified plurality of multi-destination trees, an initial number of multi-destination trees corresponding to the smallest values of the determined plurality of cost values; and
    removing at least one multi-destination tree from the initial number of multi-destination trees to produce the predetermined number not exceeding the upper bound value.

8. A network device, comprising:
    a processor; and
    a memory containing a program that, when executed by the processor, performs an operation for optimizing traffic in a link-state network including the network device, comprising:
        receiving, at the network device, a multi-destination message to be transmitted to a plurality of destination nodes;
        identifying a plurality of multi-destination trees within the link-state network that include the network device, each of the plurality of multi-destination trees having a respective root node;
        determining a plurality of cost values, wherein each of the plurality of cost values corresponds to a respective one of the identified plurality of multi-destination trees, and is based on one or more links along a shortest path from the network device to the root node of the respective multi-destination tree;
        applying a load-balancing function to a predetermined number of the identified plurality of multi-destination trees corresponding to the smallest values of the determined plurality of cost values, wherein the predetermined number does not exceed a predetermined upper bound value; and transmitting the multi-destination message from the network device using a multi-destination tree selected by the load-balancing function.

9. The network device of claim 8, wherein the link-state network is distributed across a plurality of sites.

10. The network device of claim 9, wherein the plurality of multi-destination trees includes, for each of the plurality of sites, at least one multi-destination tree having a root node located at the site.

11. The network device of claim 8, wherein determining the plurality of cost values further comprises, for each of the plurality of multi-destination trees:
    determining the shortest path having fewest links between the network device and the root node of the multi-destination tree;
    determining a respective link cost value for each link along the shortest path; and
    determining the cost value for the multi-destination tree based on the sum of the link cost values for each link along the shortest path.

12. The network device of claim 11, wherein the link cost value for each link is determined based on at least one of monetary cost, geographic distance, cost of security, availability of redundancy within the link-state network, and a measure of latency.

13. The network device of claim 8, wherein the upper bound value is provided via user input.

14. The network device of claim 8, the operation further comprising:
    determining, from the identified plurality of multi-destination trees, an initial number of multi-destination trees corresponding to the smallest values of the determined plurality of cost values; and
    removing at least one multi-destination tree from the initial number of multi-destination trees to produce the predetermined number not exceeding the upper bound value.

15. A computer program product for optimizing traffic in a link-state network, comprising:
    computer code that receives, at a first node within the link-state network, a multi-destination message to be transmitted to a plurality of destination nodes;
    computer code that identifies a plurality of multi-destination trees within the link-state network that include the first node, each of the plurality of multi-destination trees having a respective root node;
    computer code that determines a plurality of cost values, wherein each of the plurality of cost values corresponds to a respective one of the identified plurality of multi-destination trees, and is based on one or more links along a shortest path from the first node to the root node of the respective multi-destination tree;
    computer code that applies a load-balancing function to a predetermined number of the identified plurality of multi-destination trees corresponding to the smallest values of the determined plurality of cost values, wherein the predetermined number does not exceed a predetermined upper bound value;
    computer code that transmits the multi-destination message from the first node using a multi-destination tree selected by the load-balancing function; and
    a non-transitory computer-readable medium storing the computer codes.

16. The computer program product of claim 15, wherein the link-state network is distributed across a plurality of sites, wherein the plurality of multi-destination trees includes, for each of the plurality of sites, at least one multi-destination tree having a root node located at the site.

17. The computer program product of claim 15, wherein the computer code that determines the plurality of cost values further comprises computer code that, for each of the plurality of multi-destination trees:
    determines the shortest path having fewest links between the first node and the root node of the multi-destination tree;
    determines a respective link cost value for each link along the shortest path; and
    determines the cost value for the multi-destination tree based on the sum of the link cost values for each link along the shortest path.

18. The computer program product of claim 17, wherein the link cost value for each link is determined based on at least one of monetary cost, geographic distance, cost of security, availability of redundancy within the link-state network, and a measure of latency.

19. The computer program product of claim 15, further comprising computer code configured to receive user input to determine the upper bound value.

20. The computer program product of claim 15, further comprising:
    computer code that determines, from the identified plurality of multi-destination trees, an initial number of multi-destination trees corresponding to the smallest values of the determined plurality of cost values; and
    computer code that removes at least one multi-destination tree from the initial number of multi-destination trees to produce the predetermined number not exceeding the upper bound value.

* * * * *